United States Patent
Richardson et al.

[15] 3,672,449
[45] June 27, 1972

[54] SELECTIVELY REDUCING THE PERMEABILITY OF A THIEF ZONE BY ELECTROLESS METAL PLATING

[72] Inventors: Edwin A. Richardson; Russell C. Ueber, both of Houston, Tex.

[73] Assignee: Shell Oil Company, New York, N.Y.

[22] Filed: Dec. 16, 1970

[21] Appl. No.: 98,872

Related U.S. Application Data

[63] Continuation-in-part of Ser. No. 817,722, April 21, 1969, abandoned.

[52] U.S. Cl. ..................................................166/292
[51] Int. Cl. .....................................................E21b 33/13
[58] Field of Search .................166/250, 285, 291–295, 166/300

[56] References Cited

UNITED STATES PATENTS

| | | | |
|---|---|---|---|
| 2,541,688 | 2/1951 | Cordwell | 166/295 |
| 3,515,216 | 6/1970 | Gies | 166/288 |
| 3,115,930 | 12/1963 | Bernard | 166/295 |
| 3,393,737 | 7/1968 | Richardson | 166/292 |
| 3,438,440 | 4/1969 | Richardson | 166/292 |
| 3,438,441 | 4/1969 | Richardson | 166/292 |

*Primary Examiner*—Robert L. Wolfe
*Attorney*—H. W. Coryell and Harold L. Denkler

[57] ABSTRACT

In selectively plugging a thief zone within a reservoir interval, solutions for activating and effecting an electroless metal plating are injected so that most of the injected fluid enters the thief zone. The composition and amount of the plating materials are adjusted to deposit sufficient metal to reduce the permeability of the thief zone.

5 Claims, 5 Drawing Figures

INVENTORS:
EDWIN A. RICHARDSON
RUSSEL C. UEBER
BY: *Louis J. Bovasso*

THEIR ATTORNEY

PATENTED JUN 27 1972

INVENTORS:
EDWIN A. RICHARDSON
RUSSEL C. UEBER

BY: *Louis J. Bovasso*

THEIR ATTORNEY 3,672,449

SELECTIVELY REDUCING THE PERMEABILITY OF A THIEF ZONE BY ELECTROLESS METAL PLATING

CROSS-REFERENCE

This application is a continuation-in-part of copending patent application, Ser. No. 817,722, filed Apr. 21, 1969, and now abandoned.

BACKGROUND OF THE INVENTION

This invention relates to a method for reducing the permeability of a selected portion within an interval of earth formations, e.g., a thief zone, by utilizing an electroless metal plating process to deposit sufficient metal to reduce the permeability. The term "thief zone" refers to any region or zone that exhibits an undesirably high permeability relative to the permeabilities of adjacent portions of a subterranean earth formation, i.e., a permeability that causes too much of a fluid that is injected into an interval of earth formations to flow into the thief zone.

The problem of selective plugging of formations to improve oil recovery is well known in the art, as evidenced by reference to U.S. Pat. Nos. 2,864,448; 2,801,699; 2,787,325; 3,261,400; and 3,141,503. In general, the entire permeable zone is plugged with a uniform plugging material and thereafter the less permeable zones are treated in a suitable manner so as to render them more permeable such as by acid treatment or the like. Under these conditions, it becomes a difficult and costly procedure to subsequently remove the plugging material from desired productive zones for subsequent treatment for recovery of oil therefrom.

In many situations it is common practice to drill through all oil-productive zones, cement and perforate casing so as to produce all zones simultaneously. In other cases, for example where said production is a problem, special liners that exclude sand are hung along the productive intervals or zones and surrounded with sand or gravel of a selected size, rather than, or in addition to, cementing and perforating a casing. In liner or gravel pack completions, it is often very difficult, if not impossible, to successfully conduct secondary recovery operations when one of the zones is more permeable that other portions of the interval. As a result, the displacing fluid, be it steam, gas or water, channels quickly through the thief zone or depleted permeable zones giving poor displacement in the remainder of the interval.

In formation intervals that contain a thief zone, it is generally necessary to inject fluid containing reactants that form a plugging material into the thief zone. This is often difficult to do because communication behind the liner or casing permits the plugging agent to flow into portions of the interval in which plugging is not desired. Mechanical thief zone-isolating means or uses of fluids of varying viscosities and gel-set times to control the flow of plugging agents behind the liner are generally unsuccessful and in addition are costly and difficult to control and place. Although numerous chemical and mechanical techniques have been developed to isolate or plug thief zones, each has met with limited success. For example, in steam or water injection wells, known techniques have seldom been successful in plugging high permeability zones that accept essentially all the injected water and produce essentially no oil.

SUMMARY OF THE INVENTION

A primary object of this invention is the provision of a process for selectively and substantially permanently plugging a thief zone within an interval of subterranean reservoir formation.

In practicing this invention, fluid communication is provided between a surface location and a subterranean reservoir interval that contains at least one relatively highly permeable zone. The compositions of solutions for activating and effecting an electroless metal plating within a subterranean earth formation are adjusted to provide a relatively rapid rate of metal deposition at a temperature existing within the reservoir interval and the solutions are injected into the reservoir interval. The solutions are injected at pressures that cause a significant rate of inflow without fracturing the reservoir or overstressing the well equipment. The density of the fluid standing in the well is adjusted to the extent required to cause fluid having a density substantially equalling those of the activating and plating solutions to be disposed in the portion of the well adjacent to the reservoir interval. This insures that most of the injected fluid enters the most permeable zone within the interval. Enough metal plating solution is injected to reduce the permeability of the most permeable zone, and thus, to decrease the injectivity of the reservoir interval.

Where the plating solution is injected in response to a measured or substantially constant pressure, a reduction in the permeability of the thief zone is detectable at a surface location in the form of an increase in injection pressure or a decrease in the rate of fluid inflow.

Where the selectivity of the treatment should be high, so that substantially no plugging material is deposited within any portion less permeable than the thief zone, the earth formation temperatures within the near-well portion of the reservoir interval are adjusted so that the thief zone is hotter than the other portions of that interval. The electroless metal plating solution composition is correlated with the adjusted temperature so that the metal plating reaction is relatively rapid at the temperature of the thief zone but is relatively slow at the temperature of less permeable portions of the reservoir interval. Enough of the plating solution to reduce the permeability of the thief zone is displaced into the interval immediately ahead of substantially inert fluid and the plating solution is displaced through and beyond the near-well portion of the reservoir interval.

DESCRIPTION OF THE PREFERRED EMBODIMENTS

Figure 1:
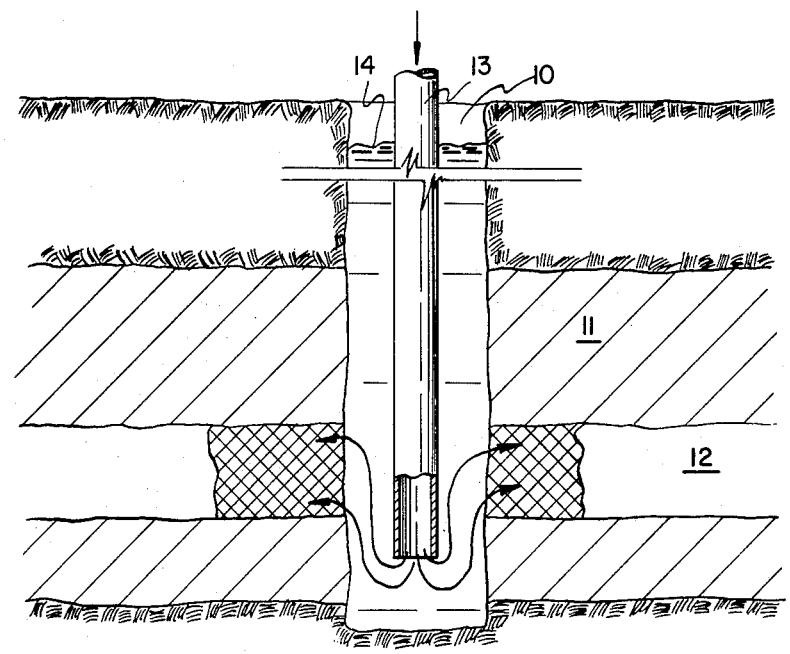
FIG. 1 is a vertical sectional view showing a well borehole extending into communication with a zone of high permeability, e.g., a thief zone, disposed in a subterranean earth formation.

Referring now to the drawing, FIG. 1 shows a well borehole 10 opened into fluid communication with a reservoir interval, or interval of permeable subterranean earth formation 11. A thief zone 12, that is, a layer of relatively high permeability with respect to other portions of formation 11, is disposed within the earth formation 11.

Although this invention will be described hereinbelow with respect to a single thief zone, obviously a plurality of such thief zones may be disposed in a reservoir interval such as an earth formation 11 traversed by a well borehole 10.

Referring again to FIG. 1, a tubing string 13 is disposed in well borehole 10. If desired, well borehole 10 may be cased (not shown).

In operating the present invention, the density of the fluid 14 in the portion of well borehole 10 adjacent to formation 11 is preferably adjusted to provide a density substantially equalling those of solutions to be injected for causing an activation and an electroless metal plating of the earth formation material. Such activating and plating solution are injected through tubing 13. The injection pressure is preferably kept relatively low to cause a significant amount of inflow into thief zone 12 without causing a significant amount of inflow into other portions of formation 11. During such injections, the height and/or back pressure on a column of fluid 14 in well borehole 10 is adjusted to provide a downhole pressure substantially equalling the formation fluid pressure. The path of the injected fluid tends to follow the direction of the arrows, with most of the fluid entering thief zone 12.

Preferably a determination is made of the amount of plating solution required to cause a selected amount of reduction in the permeability of an earth formation at least similar to thief zone 12. A slug of fluid comprising the predetermined amount of plating solution is then injected into the activated interval of permeable earth formation 11 containing thief zone 12.

Alternatively or additionally, an indication of when the amount of plating solution that has been injected is sufficient to cause a significant reduction in the permeability of the thief zone can be obtained from the injectivity of reservoir interval. For example, if fluid is being pumped into tubing 13 at a constant rate, when the permeability of thief zone 12 is reduced, the injection pressure increases to that required to cause such a rate of inflow into the less permeable portions of reservoir interval 11; or, if the injection pressure is kept constant, the rate of inflow is reduced.

Where the plugging treatment selectivity is important, it can be increased. The temperatures within reservoir interval 11 are adjusted so that the near-well portion of the thief zone 12 is the hottest portion. This can be affected, for example, by circulating steam into borehole 10 through the annulus around tubing 13 while flowing liquid out through tubing 13 and, when the zone adjacent to formation 11 is occupied by steam, terminating the outflow through tubing 13 and forcing steam into the reservoir interval. In such a process, most of the steam will enter thief zone 12 as indicated by the arrows, and this portion of the reservoir interval will become heated to substantially the temperature of the inflowing steam.

Electroless metal plating earth formation activating and plating solutions are formulated as described above with the reactivity of the plating solution being adjusted to be rapid at the temperature to which zone 12 is heated by the injected steam and slow at the normal reservoir temperature. A slug of relatively cool (e.g., ambient temperature) activator solution is preferably injected through tubing 13 to accept some heat from the walls of the tubing and borehole and transfer it into thief zone 12, as the activator solution moves along the tubing and walls and enters that zone. The required amount of plating solution is preferably injected as a slug displaced ahead of an inert fluid, such as water or brine. The portions of plating solution that enter zone 12 are heated at a temperature at which they react rapidly, but the portions that enter other zones within the interval 11 are not so-heated and react at a relatively slow rate. The slowly reacting plating solutions in these cooler zones is then displaced away from the well by the inert fluid following the plating solution, so that substantially no metal is deposited and no reduction in permeability is caused in any portion of the reservoir interval other than the thief zone 12. Such treatments can be repeated if a greater degree of reduction of the thief zone permeability should be desired.

In the embodiment shown in FIG. 2, wherein like numerals refer to like parts of FIG. 1, tubing string 13 is surrounded by packer 15 and a screen assembly 16, such as a wire-wrapped slotted liner, is disposed below the tubing string. Screen assembly 16 is gravel packed by placing gravel 17 between screen assembly 16 and the formations adjacent thereto, as illustrated in FIG. 2, e.g., by procedures well known in the art.

Figure 2:
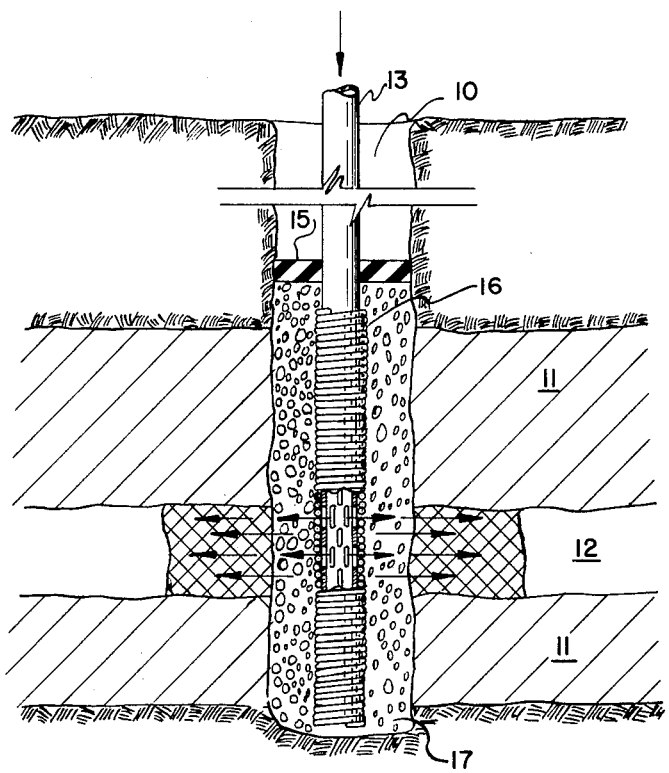
FIG. 2 is a vertical sectional view of the well borehole of FIG. 1 showing an alternate method of treating a highly permeable thief zone of FIG. 1.

In the situation illustrated in FIG. 2, part of an oil sand in formation 11 has partially flooded out (as often occurs in secondary recovery oil production operations) and a layer comprising the thief zone 12 has become significantly more permeable than the remainder of the interval. The aforementioned activating and plating fluids are injected through tubing string 13, through screen assembly 16, through gravel 17, and into thief zone 12. The arrows indicate the path of preferred flow of the injected fluids, as long as their densities equal to or near that of the fluid present in the borehole. The selectivity is enhanced by an injection pressure low enough to minimize flow into the less permeable portions of formation 11. The metal plating solution is flowed into thief zone 12 is a volume sufficient to significantly reduce the permeability of that zone.

In like manner, any additional thief zones that may be contained in formation 11 may be partially plugged, (in sequence from most permeable to least permeable) thereby providing all of the formations adjacent to well borehole 10 with substantially the same degree of permeability. Fluids may then be relatively uniformly produced from or injected into substantially the whole interval of formation 11, which now contains at least one partially plugged thief zone 12.

An electroless metal plating solution begins to and continues to deposit metal on the first contacted portions of an activated earth formation through which it is flowed. The activating fluid may be injected prior to the metal plating solution so that an activator-containing electroless metal plating solution is formed in situ, along the activator-wetted surfaces of the rocks. Alternatively, the activating fluid may be mixed with the metal plating solution either at a surface location or within well borehole 10 so as to form an activator-containing metal plating solution. When the injection of such a plating solution is begun into an activated earth formation interval containing one or more thief zones, the rates of fluid entry (and thus the amounts of metal plating) are greatest within the most permeable of the thief zones. When the injection pressure is kept substantially constant, the plating rate remains relatively high until the amount of plating that has occurred within a thief zone has reduced the permeability of the thief zone to a value approaching that of the remainder of the interval of permeable earth formation.

Figure 3:
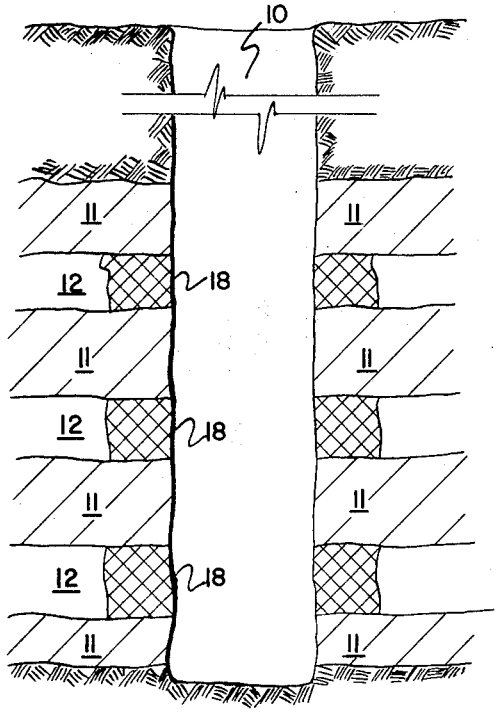
FIG. 3 is a vertical sectional view of a well borehole showing a plurality of thief zones vertically spaced along the well borehole of FIGS. 1 and 2, treated in accordance with the teachings of this invention.

The treating of a plurality of thief zones is illustrated in FIG. 3, wherein like numerals refer to like parts of FIGS. 1 and 2. Thus, a series of thief zones 12 disposed in formation 11 have all been metal plated, as indicated by metal plating 18, in accordance with the teachings of this invention. Conventional straddle packing assemblies (not shown) may be used to inject the metal plating solutions into thief zones in one reservoir interval of a multiple completion well. In this manner, the permeability of all of the thief zones in each reservoir interval may be reduced to a permeability approaching that of the remaining zones in each interval.

Figure 5:
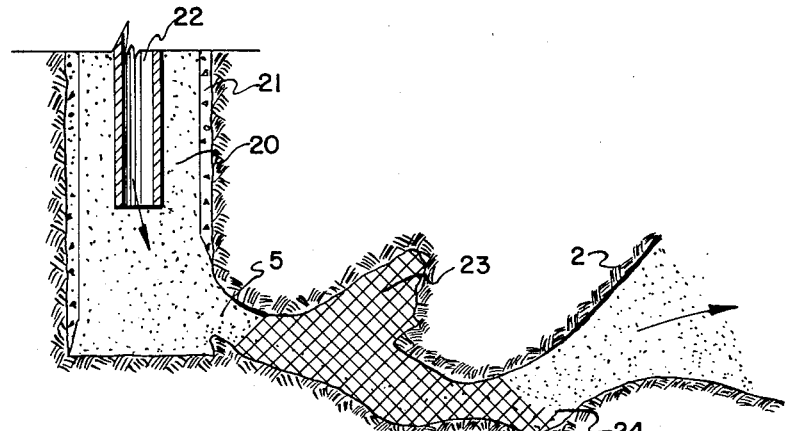
FIG. 5 is a vertical sectional view of a portion of a well borehole showing a further treatment of a thief zone encountered by the well borehole.

An additional advantage of the method of our invention is provided by the fact that, since the metal plating of thief zone 12 occurrs within the first few inches outwardly from well borehole 10, if the permeability of the interval of the permeable earth formation adjacent to well borehole 10 should be inadvertently reduced along the entire interval thereof, fluid communication with selected portions of the interval may be readily reestablished by perforating the plugged zone or zones. Such perforations may be made at preselected locations so that the thief zone or zones remain plugged.

Where thief zone 12 is a fractured or vugular interval having relatively large pores or openings, those openings are preferably partially filled by injecting a slurry of granular solids capable of becoming packed in or bridging across the openings, as will be discussed further hereinbelow with respect to FIG. 5. One suggested method of plugging large cavities by injection of a viscous liquid containing suspended particles is disclosed in a U.S. Pat. No. 3,415,318, to Meijs. Such a slurry or liquid may be injected prior to or during the injection of the plating solution. In the latter situation, the size of the slug of plating solution is preferably based on the amount of plating needed to produce the selected degree of reduction of permeability within the so-packed openings of thief zone 12.

The location of the thief zone 12 (or thief zones) and the size and type of opening (or openings) that it contains may be determined by techniques known in the art. Such techniques, for example, may include core analysis, well log analysis, injectivity profiling, etc., all well known in the oil production art. Such determinations may be made by means of the methods disclosed in a U.S. Pat. No. 3,503,447 by T. W. Hamby. In the Hamby patent, measurements are made of the injectivity with depth within a well borehole. Measurements are then made of the radioactivity that results from injecting a slurry of radioactive particles at a depth of relatively high fluid injectivity. Finally, the interval of relatively high fluid injectivity is treated by injecting a plugging agent capable of permeating fine pores. The injection of the plugging agent is accomplished by an injection of slurried solid particles where the radioactivity is low due to the flowing of radioactive particles into relatively large openings and moving away from the well borehole. The plugging agent is used without the entrained solids where the radioactivity is high due to the radioactive particles being screened out on the face of the thief zone.

The method of our invention is adapted to use substantially any of the activating and electroless metal plating solutions disclosed in U.S. Pat. No. 3,393,737. Similar solutions are also disclosed in U.S. Pat. Nos. 3,438,440 and 3,438,441, and are incorporated herein by reference.

Thus, as disclosed in U.S. Pat. No. 3,393,737, the metal-containing solution may be acidic having a pH of 2–6, preferably 4–6, or alkaline with a pH range of 8–14, preferably 8–10. The pH regulators may be acids such as hydrochloric or sulfuric acid or alkalizer such as amines, ammonium hydroxide, e.g., triethanolamine, caustic sodas, sodium carbonate, etc. In the present process, the regulation and control of the pH of the solution is selected to provide heavy metal deposition at the inlet face of the formations to be treated and thus to reduce the permeability of the formations into which the solution is flowing.

The metal plating compound may be a polyvalent metal compound of which preferred compounds include nickel, cobalt, copper, iron compounds and mixtures thereof, e.g., nickel and/or cobalt chloride and/or sulfate and these metal compounds are reduced by such reagents as hypophosphorous acid, hypophosphites, e.g., sodium hypophosphite or alkaline solution of molybdenate, formate and/or hydroxy carboxylates, e.g., hydroxy-acetate. The concentration of the metal-containing compounds and the reducing agents in aqueous solutions may be varied over a wide range such as from 1 to 50 percent, respectively, and preferably from 5 to 40 percent each.

To keep the hydrogen evolution to a minimum during the reaction, the reducing agents in the metal-plating solutions should be kept at a minimum generally not in excess of 10 percent of the total electroless metal plating solution, particularly when the solutions are alkaline. Also, hydrogen evolution can be effectively suppressed and the life of the metal-plating reaction increased by addition of such aqueous solutions buffering and chelating agents such as hydroxy carboxylic acids and polycarboxylic acids and their salts, e.g., citric, tartaric, maleic, gluconic, succinic acids or ammonium or alkali metal salts of said acids such as sodium citrate, sodium succinate and the like. However, the gas can be effectively eliminated from the area being metallized by applying pressure of 200 pounds or more on the system.

To promote wetting of the surfaces to be metallized by the electroless process of the present invention, wetting agents may be used such as reaction products of alkylphenol and alkylene oxide, e.g., nonyl phenolethylene oxide reaction product wherein the number of ethylene oxide units in the molecule ranges from 4 to 20; sulfated alcohols, sulfonate of fatty acids having from 12 to 18 carbon atoms, e.g., sulfonated oleic acid, sulfonated mineral oil fractions and the like.

Also, when using hypophosphites as the reducing agent, their concentration should be controlled, since, depending in part on the phosphorus content of the solutions, the metal being plated may be in the form of an alloy of metal-phosphorus nickel phosphide. High concentrations such as above 10 percent of hypophosphite in the metal plating solution tend to form these alloys.

Where thief zone 12 contains relatively large openings, as discussed hereinabove, it is sometimes desirable to mix at least a portion of the activating solution with at least a portion of the plating solution at a surface location or within well borehole 10. This causes some reaction to occur and some metal to be precipitated as granular particles before the mixed solutions enter thief zone 12, as discussed hereinabove with respect to FIGS. 1 and 2. The unreacted components of the activating and plating solutions continue to react and plate metal on both the solid components of the earth formations within thief zone 12 and the granular particles of metal that are screened out on the face of, or in the pores of, thief zone 12.

Figure 4:
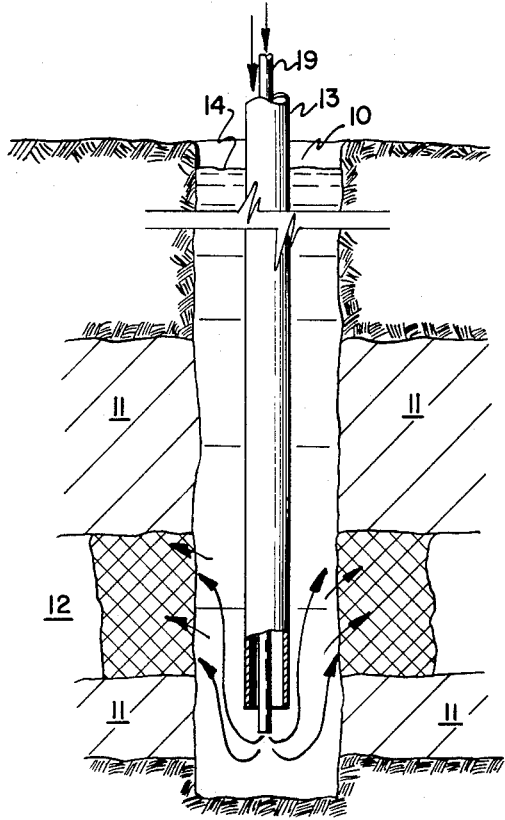
FIG. 4 is a vertical sectional view of the well borehole of FIGS. 1 and 2 showing an alternate method of injecting a metal-plating solution into the thief zone in accordance with the teachings of this invention.

Preferably, it is desirable to use a pair of conduits for conveying separate streams of fluids to the depth of the thief zone being treated. This is especially desirable where the thief zone is relatively hot, or where the thief zone permeability is actually only nominal but is high relative to that of the remainder of the interval of the permeable earth formation. Thus, as illustrated in FIG. 4, wherein like numerals refer to like parts of FIGS. 1 and 2, the activating fluid and the components of the electroless metal plating solution, other than the reducing agent (for example, as discussed in U.S. Pat. No. 3,393,737) may be injected down tubing string 13 while the reducing agent is injected down a second tubing string 19 which may be concentric with tubing string 13. Alternatively, the reducing agent may be injected down the annulus between tubing string 13 and the formation 11 by providing suitable conduits (not shown). In both cases, the reactants are mixed just prior to their entry into thief zone 12. In general, the components and concentrations of the activating fluid and the metal plating solution are preferably selected to provide a relatively high rate of metal plating at the temperature existing in thief zone 12.

In a preferred embodiment of the invention, fine sand may be packed into thief zone 12 if sand is not already present behind the well borehole casing or liner. This is illustrated in FIG. 5 wherein a well borehole 20 is shown, cased at casing 21, with tubing string 22 disposed therein. As indicated by the direction of the arrows, fine sand may be injected down tubing string 22 into thief zone 23 until sufficient sand forms a deposit 24 in thief zone 23. The metal treating fluids, as discussed hereinabove, are then injected, as for example down the annulus of well borehole 20, until the desired metal plating of sand occurs, thus consolidating and reducing the permeability of the fine sand deposit 24.

In this invention, the activating solution tends to coat the generally non-catalytic earth formation materials with adsorbed particles of a metal that is a catalyst for an electroless metal plating. The plating solution reaction is catalyzed by such reactive sites on the earth formation materials and deposits a coating that becomes thicker as more solution flows into the pores of the earth formation. As the coating becomes thicker, the pores become smaller, the inflow becomes slower and the rate of plugging becomes slower since more of the inflowing liquid is diverted into other zones within the reservoir interval. Such a plating leaves a plugged zone in which a metal coating closes off most but not all of the openings within the pores. One particular advantage of such a treatment is the fact that although the metal coatings are substantially permanently resistant to substantially all fluids (such as solvents, brines, and alkaline fluids) with which they are apt to be contacted during the operations of the well, they can be readily dissolved by acids and do retain sufficient residual permeability to allow such an acid to be injected into the plugged zones where it relatively rapidly removes the metal coating and restores the permeability of the earth formation.

What is claimed is:

1. A process for treating a well to selectively reduce the permeability of the most permeable portion of a reservoir interval, comprising:
   providing a path of fluid communication between a surface location and a reservoir interval that contains at least one zone of relatively high permeability;

adjusting the compositions of solutions for activating and effecting an electroless metal plating in an earth formation to provide a relatively high rate of metal plating at a temperature existing within the reservoir interval;

adjusting the composition of fluid in the well to the extent required to cause fluid having a density substantially equalling those of said activating and plating solutions to be disposed in the portion of the well adjacent to said reservoir interval; and injecting said activating and plating solutions into the reservoir interval, with the amount of the plating solution being sufficient to deposit a coating thick enough to cause a significant reduction in the permeability of said zone of relatively high permeability.

2. The process of claim 1 in which said activating and plating solutions comprise sequentially injected aqueous solutions of substantially equal densities and said fluid disposed in the portion of the well adjacent to the reservoir interval is a substantially inert aqueous solution of substantially equal density.

3. The process of claim 1 in which said activating and plating solutions comprise aqueous solutions of substantially equal density which are mixed prior to their injection into said reservoir.

4. The process of claim 1 in which a liquid suspension of granular material is injected into said reservoir interval prior to the injection of said activating and plating solutions.

5. The process of claim 1 in which:

the temperature within the near-well portion of said reservoir interval is adjusted to be highest within the zone of relatively high permeability;

the composition of said plating solution is adjusted to provide a relatively high rate of metal plating at the temperature within said zone of relatively high permeability and a relatively low rate of metal plating at the temperature within the other near-well portions of the reservoir interval; and said metal plating solution is displaced into the reservoir interval ahead of a substantially inert fluid and is displaced through and beyond said near-well portion of said reservoir interval before a significant amount of plating has occurred at said relatively low rate of metal plating.

* * * * *